United States Patent [19]
Wepf

[11] Patent Number: 5,282,970
[45] Date of Patent: Feb. 1, 1994

[54] METHOD FOR ENVIRONMENTALLY BENIGN PAINT SPRAYING WITH AN AIR-DRYING LACQUER DISSOLVED, EMULGATED OR DISPERSED IN WATER

[75] Inventor: Hans-Peter Wepf, Frauenfeld, Switzerland

[73] Assignee: Unicolor AG, Lachen, Switzerland

[21] Appl. No.: 966,909

[22] Filed: Oct. 23, 1992

Related U.S. Application Data

[63] Continuation of Ser. No. 859,187, Mar. 27, 1992, abandoned.

[30] Foreign Application Priority Data

Apr. 9, 1991 [CH] Switzerland ............... 01052/91

[51] Int. Cl.$^5$ ............................................. B01D 61/16
[52] U.S. Cl. ...................... 210/641; 210/651; 210/652; 210/96.2
[58] Field of Search .............. 210/96.2, 651, 641, 210/195.2, 652, 712, 703, 714; 106/287.34

[56] References Cited

U.S. PATENT DOCUMENTS 5,092,928  3/1992  Spangler .................. 210/703 X

FOREIGN PATENT DOCUMENTS

| 715025 | 5/1968 | Belgium . |
| 032554 | 7/1981 | European Pat. Off. . |
| 335210 | 7/1981 | European Pat. Off. . |
| 117586 | 9/1984 | European Pat. Off. . |
| 141171 | 5/1985 | European Pat. Off. . |
| 271015 | 6/1988 | European Pat. Off. . |
| 306628 | 3/1989 | European Pat. Off. . |
| 312987 | 4/1989 | European Pat. Off. . |
| 1669191 | 1/1968 | Fed. Rep. of Germany . |
| 2353469 | 4/1975 | Fed. Rep. of Germany . |
| 2945523 | 5/1981 | Fed. Rep. of Germany . |
| 3428300 | 2/1986 | Fed. Rep. of Germany . |
| 1557411 | 1/1969 | France . |
| 2375281 | 12/1976 | France . |
| 49-51324 | 5/1973 | Japan . |

OTHER PUBLICATIONS

Research Disclosure N.128, Dec. 1974, Havant GB, p. 4; AKZO Chemie BV: "Stabilisation of Printing Inks and Coating containing Chlorinated Acetophenones as Photo-initiators" Nr 12806.
Ullmanns Encyklopadie der Technischen Chemie; 4th Ed., vol. 15, pp. 658-660.
Rompps Chemie-Lexikon, p. 231.

*Primary Examiner*—Frank Spear
*Attorney, Agent, or Firm*—EGLI International

[57] ABSTRACT

In the process of spraying in a cubicle having a water-rinsed rear wall the cubicle waste water is separated by ultrafiltration into permeate and lacquer-containing residue. The permeate is recycled. Fresh spraying composition is fed-in. The lacquer preferably is an alkyd resin, an acrylic resin, a polyvinyl acetate resin, a silicone resin, a copolymer thereof, a mixed polymer thereof or a mixture thereof. The spraying composition comprises a component for preventing coalescence, preferably one or several aliphatic amines having an average molecular weight of 75 to 133 or mixtures or derivatives thereof, and a component for retardation of the drying. If the lacquer is capable of being emulgated or dispersed in water, the spraying composition and/or the cubicle waste water preferably comprises a component for stabilizing the emulsion or dispersion. A component for adjusting the throughput in the ultrafiltration is admixed to the cubicle waste water, preferably a derivative of glycol or of a higher alcohol. The spraying composition and/or the cubicle waste water additionally may contain a biocidal component. The conductibility of freshly fed water is kept below a predetermined limiting value preferably of $10^{-4}$ $\Omega^{-1}cm^{-1}$, which is preferably achieved by reverse osmosis. The lacquer-containing residue of the cubicle waste water is enriched by removing water until its lacquer content is about equal to that of fresh spraying composition. The enrichment and reuse may proceed in essentially continuous or discontinuous manner, in the latter case the lacquer-enriched residue is stored intermediately.

9 Claims, 1 Drawing Sheet

METHOD FOR ENVIRONMENTALLY BENIGN PAINT SPRAYING WITH AN AIR-DRYING LACQUER DISSOLVED, EMULGATED OR DISPERSED IN WATER

This is a continuation application of Ser. No. 07/859,187, filed Mar. 27, 1992 now abandoned.

BACKGROUND OF THE INVENTION

1. Field of the Invention

The present invention relates to an environmentally benign paint spraying method utilizing a method for environmentally air-drying lacquer dissolved, emulgated or dispersed in water in a paint spraying station. The paint spraying station having a cubicle with a water-rinsed rear wall for collecting and washing out of the overspray in cubicle waste water. The cubicle waste water then being separated by ultrafiltration into permeate and lacquer-containing residue. The permeate being returned to the paint spraying station, and the lacquer-containing residue being enriched with lacquer by removing water until its lacquer content is essentially equal to that of spraying composition which is freshly fed to the spray painting station. The residue that is enriched with lacquer in this way is then admixed to the freshly fed spraying composition for reuse in spray painting. Also admixed therein is a component for preventing coalescence of the lacquer being admixed to the spraying composition fed to the paint spraying station.

2. Discussion of the Prior Art

In prior art devices the overspray usually will be disposed of, which constitutes a heavy burden for the environment and is also very costly. For instance, a binding agent for oven-drying lacquer, which can be dispersed in water, is known from EP-0032554: the disposal of such a binding agent constitutes a heavy burden to the environment, because it contains phosphor. Besides, special measures have to be taken so as to avoid conglutination of the appliances used for separating the overspray from the cubicle waste water, in this context cf. for example DE-3704683.

The separation of cubicle waste water into permeate and lacquer-containing residue by means of ultrafiltration is known, for example, from EP-0307047, EP-0245863, EP-0137877 or EP-0127685. On the other hand, it is known from EP-0318827 or EP-0271015 that the permeate has to be deacidified before it is returned to the paint spraying residue. Both of these aspects of the state of the art are taken into account in EP-0217212.

Experiments for the recuperation of the lacquer from the overspray in cubicle waste water are made reference to in "Oberfläche+JOT" 5/1987, page 36, however, in this publication they are considered as "successful only in certain cases". In "Oberfläche+JOT" 2/1988, pages 24–25, lacquer and binding agent circuits in the spraying cubicle are qualified as "future", while the recuperation of the lacquer by means of special reprocessing is mentioned as known. Also in DE-3800980, the recuperation of the lacquer by means of reprocessing is known.

In "Oberfläche+JOT" 5/1988, pages 61–63, the use of amines for preventing coalescence of air-drying lacquer and the additional cleaning of the cubicle waste water by reverse osmosis following its separation into permeate and lacquer residue are mentioned. In this publication, the recuperation of the lacquer from the overspray is considered as being "in its initial stages of development".

Therefore it is in accordance with prior art that the lacquer-containing residue has to be disposed of.

From EP-0141171 or U.S. Pat. No. 4,607,592 a method for paint spraying with a dispersion of lacquer in water is known. The paint spraying station is equipped with a cubicle with water-rinsed rear wall for collecting and washing out of overspray in cubicle waste water. If the concentration of the overspray in the cubicle waste water reaches about 20% a partial current of the cubicle waste water circuit is conveyed through a filtration unit so as to be separated into filtrate and lacquer-containing residue. The filtrate consists of cleaned water and is returned to the paint spraying station for water rinsing of the cubicle rear wall. At the lacquer-containing residue several parameters are measured such as for example conductibility, in order to regulate filtration in a way that the measured parameters will be approximately equal to those in the freshly fed dispersion. The residue, which is enriched with lacquer in this way, will then be admixed to freshly fed dispersion and thus reused for paint spraying. The overspray in the cubicle waste water is not stable, and it is specified in EP-0141171 or U.S. Pat. No. 4,607,592 that the mixture must pass through dispergers so as to temporarily stabilize it. Besides, it is a drawback of this method according to EP-0141171 or U.S. Pat. No. 4607592 that only a partial current of the cubicle waste water is treated and as a consequence the unit needs a costly pipe and control system. It is probably for this reason that this method failed to gain acceptance (cf. the above quoted article in "Oberfläche+JOT").

It is known from JP-49-51324 to enrich the lacquer-containing residue with lacquer by removing water from the total cubicle waste water and to reuse the residue enriched with lacquer in this way for paint spraying. Though it is recommended to use deionized water in order to avoid contamination of the spraying composition, this only serves the purpose of avoiding to soil the spraying composition and it is expressly pointed out that also regular tap water may be used.

Thus, it corresponds to the state of the art that the lacquer-containing residue is not stable and no appropriate countermeasures are known.

As a consequence, the prior art methods of the kind mentioned above are unreliable, which is not acceptable in view of the present demands for the protection of environment.

SUMMARY OF THE INVENTION

The present invention is directed to a method for environmentally benign paint spraying utilizing an air-drying lacquer, which is dissolved, emulgated or dispersed in water, in a paint spraying station provided with a cubicle having a water rinsed rear wall for collecting and washing out of overspray in cubicle waste water. The method comprises ultrafiltration of the cubicle waste water for separating the cubicle waste water into a permeate and a lacquer-containing residue, mixing a component for adjusting the throughput in the ultrafiltration process with the cubicle waste water, delivering the permeate to the paint spraying station, enriching the lacquer-containing residue with lacquer by removing water therefrom until the lacquer content of the lacquer-containing residue is eventually equal to that of a fresh spraying composition that is utilized by the paint spraying station, mixing the enriched lacquer with the fresh spraying composition, mixing a component for preventing coalescence of the lacquer residue and a component for the retardation of the drying of the lacquer residue with the mixture obtained in the previous step, monitoring and maintaining the conductivity of the water that forms the fresh spraying composition that is supplied to the paint spraying station to a predetermined level to avoid coagulation of ions in the lacquer and supplying the final mixture to the paint spraying station for reuse.

It is the object of the invention to specify a method of the kind mentioned at the outset which is reliable and by means of which no quantities of cubicle waste water, permeate and lacquer-containing residue must be disposed of which would constitute a significant burden for the environment.

This object is achieved, according to the invention, by a method characterized in that a component for retardation of the drying is admixed to the spraying composition that is fed to the paint spraying station, that a component for adjusting the throughput in the ultrafiltration is admixed to the cubicle waste water, and that the conductibility of the water returned to the paint spraying station is monitored and kept below a predetermined limiting value.

Preferably, the component for adjusting the throughput in the ultrafiltration is a derivative of glycol or of a higher alcohol.

Preferably, the lacquer is selected from an alkyd resin, an acrylic resin, a polyvinyl acetate resin, a silicone resin, a copolymer thereof, a mixed polymer thereof or a mixture thereof.

Preferably, only such water is freshly fed to the paint spraying station which has a conductibility of less than $10^{-4} \Omega^{-1} cm^{-1}$, which is preferably achieved by reverse osmosis.

Preferably, the component for preventing coalescence of the lacquer is selected from one or several aliphatic amines having an average molecular weight of 75 to 133, mixtures thereof or derivatives thereof.

Preferably, the spraying composition and/or the cubicle waste water additionally contains a biocidal component.

Preferably, the lacquer being used is capable of being emulgated or dispersed in water, and the spraying composition and/or the cubicle waste water further comprise a component for stabilizing the emulsion or dispersion, respectively, of the lacquer in the water.

Preferably, the enrichment of the lacquer-containing residue substantially up to the lacquer content of the freshly fed spraying composition either proceeds in essentially continuous manner, the residue enriched with lacquer being reused for spray painting in an essentially continuous way, or in essentially discontinuous manner, i.e. in batches (batch method), the lacquer-enriched residue being stored in an intermediate reservoir prior to being reused for spray painting.

Besides the surmounting the above mentioned drawbacks of the prior art, an additional advantage of the method of the invention is contemplated in that its reliability (particularly in respect of the danger of lacquer being deposited in the pipes and tanks) allows an optimum design of the apparatus from an economical point of view and a reuse of the permeate and lacquer-containing residue.

The invention will be set forth hereinafter with reference being made to the drawing in which:

DESCRIPTION OF THE PREFERRED EMBODIMENTS

Figure 1:
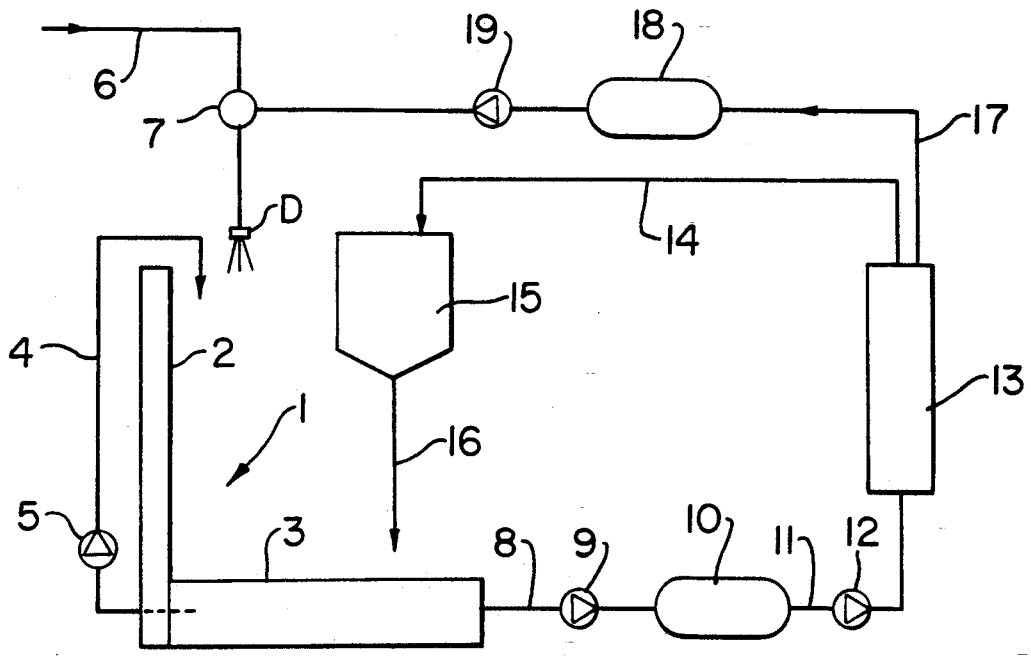
FIG. 1 is a diagram of a closed circuit passing the paint spraying station and designed for the continuous implementation of the method of the invention.
Figure 2:
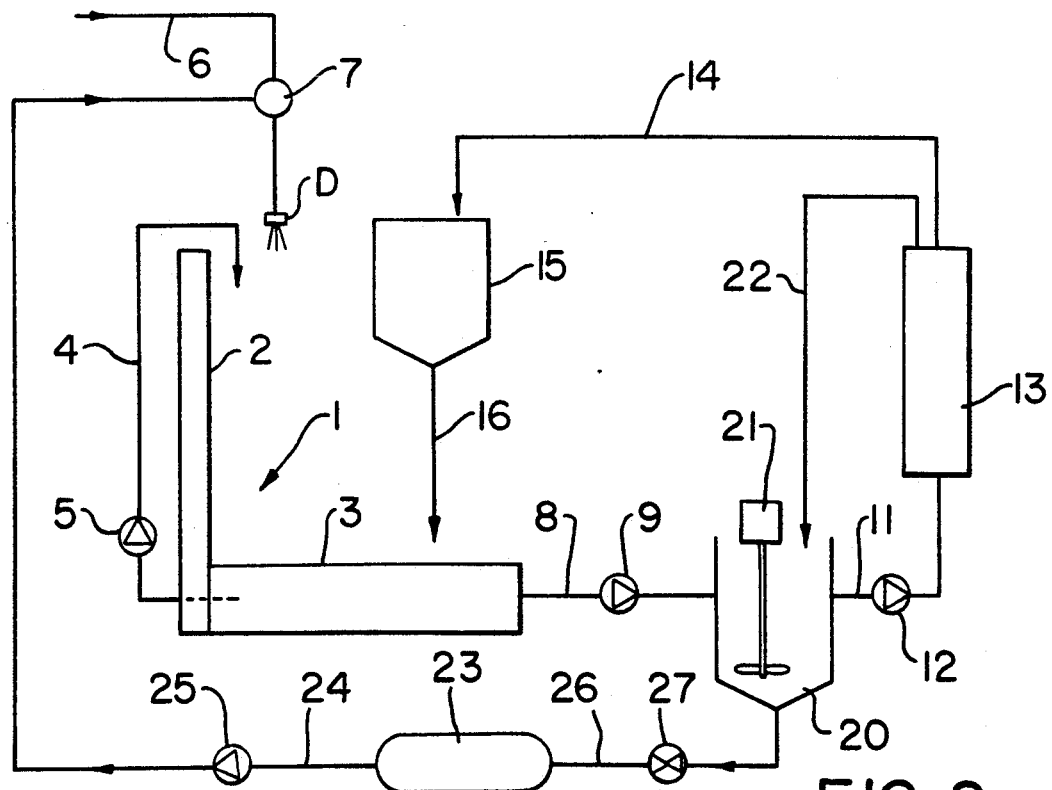
FIG. 2 is a diagram of a closed circuit passing the paint spraying station and designed for the discontinuous implementation of the method of the invention in batches (batch method).

FIGS. 1 and 2 show a paint spraying station having a cubicle 1, a water-rinsed rear wall 2, tank 3 and a rinsing conduit 4 with associated pump 5. The rinsing system of the rear wall is designed to collect and wash out the overspray in water in a known way, which is collected as cubicle waste water in the tank 3.

Fresh spraying composition based on air-drying lacquer dissolved, emulgated or dispersed in water is fed to the paint spraying station by way of a conduit 6 and a union 7 and sprayed through the nozzle D.

In FIG. 1 the cubicle waste water is conveyed to an intermediate reservoir 10 by way of a discharge conduit 8 with associated pump 9, and from there it is conveyed to an ultrafiltration unit 13 by way of a conduit 11 with associated pump 12. In the ultrafiltration unit 13 the cubicle waste water is separated into permeate and lacquer-containing residue. The permeate is returned to the paint spraying station by way of the conduit 14, the intermediate reservoir 15 and the conduit 16.

In FIG. 2 the cubicle waste water is conveyed to an intermediate reservoir 20, which is equipped with a stirrer 21, by way of the discharge conduit 8 with associated pump 9, and from there it is conveyed to an ultrafiltration unit 13 by way of a conduit 11 with associated pump 12. In the ultrafiltration unit 13 the cubicle waste water is separated into permeate and lacquer-containing residue. The permeate is returned to the paint spraying station by way of the conduit 14, the intermediate reservoir 15 and the conduit 16.

In FIG. 1 the lacquer containing residue from ultrafiltration is conveyed from the ultrafiltration unit 13 via a conduit 17 and to an intermediate reservoir 18 and from there to the union 7 by means of a pump 19.

In FIG. 2 the lacquer containing residue from ultrafiltration is conveyed from the ultrafiltration unit 13 back to the intermediate reservoir 20 by way of the conduit 22. From the intermediate reservoir 20 a discharge conduit 26 leads to an intermediate reservoir 23 by way of a stop valve 27 and from there to the union 7 via a conduit 24 with associated pump 25.

Therefore, in each embodiment, FIG. 1 and FIG. 2, the residue from the ultrafiltration process which is enriched with lacquer in the ultrafiltration unit 13 is reused for paint spraying in the nozzle D. In order to make this reuse possible, the following steps must be completed.

A component for preventing coalescence of lacquer is admixed to the spraying composition in order to avoid a condition where the lacquer that is circulating in the system will settle and clog up the system. This component is admixed to the cubicle waste water and/or to the spraying composition fed to the paint spraying station at the nozzle D. Because of the large evaporation area and the long sojourn time of the lacquer in the cubicle waste water in connection with the described recirculation, preferably a component with low vapor pressure at room temperature is selected. Such a component is selected from one or several aliphatic amines of an average molecular weight of 75 to 133, their mixtures or derivatives. The following are examples of such substances: isopropanolamine, dimethylethanolamine, diisopropanolamine and their mixtures.

Furthermore, in accordance with the invention, a component for retardation of the drying of the lacquer is admixed to the spraying composition which is fed to the paint spraying station, in order to prevent the lacquer circulating in the pump from curing (polymerizing) oxidizing, and/or conglutinating the system in an insoluble manner. The following are examples of such substances: ketoximes, butoximes, etc. and their mixtures.

A component for adjusting the throughput in the ultrafiltration protese is admixed to the cubicle waste water, which for example may be a glycol derivative. The following are examples of such substances: butylglycol, butyldiglycol, propyleneglycols and the like. However, for this purpose derivatives of higher alcohols may also be used, for example a glycerine ester.

The conductibility of the water that is freshly fed to the paint spraying station is monitored and kept below a limit in order to avoid that ions, and especially calcium ions, from coagulating the lacquer that is circulating in the system, thereby preventing the system from being clogged up. Preferably, only such water will be freshly fed to the paint spraying station, which has a conductibility of less than $10^{-4} \Omega^{-1} cm^{-1}$. This conductibility is preferably achieved by reverse osmosis. The fresh water will be needed when the system is filled up for the first time and also for compensating evaporation loss.

When the lacquer being used is capable of being emulgated or dispersed in water, there is further admixed to the spraying composition and/or the cubicle waste water a component for stabilizing the emulsion or dispersion, respectively, of the lacquer in the water. Examples of such substances are linear primary fatty alcohols such as sulfates, ethoxylates and ethoxysulfates of synthetic linear primary fatty alcohols.

Finally, for accomplishing direct reuse, the lacquer-containing residue from the ultrafiltration is enriched with lacquer by removal of water from the cubicle waste water, until its lacquer content is essentially similar to that of the freshly fed spraying composition so that the recuperated composition is equally sprayable as the freshly fed composition. This may be done in one of two ways.

In the embodiment according to FIG. 1 the enrichment of the lacquer-containing residue from ultrafiltration is continuous. The residue from ultrafiltration that has been enriched with lacquer until becoming sprayable is essentially reused continuously for paint spraying, even though it may occasionally be held up in the intermediate reservoir 18. For this purpose, the capacity of the ultrafiltration unit 13 is dimensioned in a way that it removes water from the cubicle waste water at a speed essentially equal to the speed at which permeate is fed to the paint spraying station.

In the embodiment according to FIG. 2 the enrichment of the lacquer-containing residue is accomplished in an essentially discontinuous manner, i.e. in bathces (batch method). With the help of a pump, the intermediate reservoir 20, the ultrafiltration unit 13 and the conduits 11 and 22 form a circuit in which the above increase in concentration of the lacquer content takes place. The residue that is enriched with lacquer up to sprayability will occasionally be held up in the intermediate reservoir 23 before it is reused. In the intermediate reservoir 23 the color of the spraying composition may be adjusted at one's discretion.

In this context, the capacity of the ultrafiltration unit 13 can be dimensioned in a manner such that it removes water from the cubicle waste water at a speed lower than the speed at which permeate is fed to the paint spraying station. This embodiment of the method of the invention is typically suited for operating the paint spraying station during the normal day-time work hours, the capacity of the ultrafiltration unit 13 being dimensioned in a way that the residue of the ultra-filtration will be enriched with lacquer up to sprayability at times other than the work hours and especially during night-time.

To perform the method of the invention the lacquer used will preferably be an alkyd resin, an acrylic resin, a polyvinyl acetate resin, a silicone resin, a copolymer thereof, a mixed polymer thereof or a mixture thereof, because in combination with the other measures these substances are best suited for achieving the object of this invention mentioned hereinabove.

In order to further limit the burden to the environment by increasing the period of use of the cubicle waste water between water changes which might be compelling due to the multiplication of microorganisms. For this purpose, a biocidal component will preferably be admixed to the spraying composition and/or the cubicle waste water. Examples of such substances are: triazine derivatives such as especially hexahydro-1,3,5,-triazine and benzyl alcohol as well as its derivatives in concentrations of 0.1–0.3% by volume (related to the volume of the cubicle waste water).

While the invention has been particularly shown and described with respect to the preferred embodiments thereof, it should be understood by those skilled in the art that the foregoing and other changes in form and details may be made therein without departing from the spirit and scope of the invention which should be limited only by the scope of the appended claims.

I claim:

1. A method for environmentally benign paint spraying utilizing an air-drying lacquer being dissolved, emulgated or dispersed in water, in a paint spraying station provided with a cubicle having a water-rinsed rear wall for collecting and washing out of overspray in cubicle waste water, said method comprising the steps of:

(a) ultrafiltration of the cubicle waste water for separating the cubicle waste water into a permeate and a lacquer-containing residue;

(b) mixing a component for adjusting the throughput in the ultrafiltration process with the cubicle waste water;

(c) delivering the permeate to the paint spraying station;

(d) enriching the lacquer-containing residue with lacquer by removing water therefrom until the lacquer content of the lacquer-containing residue is eventually equal to that of a fresh spraying composition that is utilized by the paint spraying station;

(e) mixing the enriched lacquer with the fresh spraying composition;

(f) mixing a component for preventing coalescence of the lacquer residue with the resultant mixture of step (e);

(g) mixing a component for retardation of the drying of the lacquer residue with the resultant mixture of step (f);

(h) monitoring and maintaining the conductivity of the water that feeds the fresh spraying composition that is supplied to the paint spraying station to a predetermined level to avoid coagulation of ions in the lacquer; and (i) supplying the mixture of step (g) to the paint spraying station for reuse.

2. A method as claimed in claim 1, wherein the step of mixing a component for adjusting the throughput in the ultrafiltration process utilizes a derivative of glycol or of a higher alcohol.

3. A method as claimed in claim 1, wherein the lacquer is selected from the group consisting of an alkyd resin, an acrylic resin, a polyvinyl acetate resin, a silicone resin, a copolymer thereof, a mixed polymer thereof or a mixture thereof.

4. A method as claimed in claim 1, wherein the step of monitoring and maintaining the conductivity of the water comprises a reverse osmosis process thereby maintaining the water being freshly fed to the paint spraying station at a conductibility of less than $10^{-4}$ $\Omega^{-1} cm^{-1}$.

5. A method as claimed in claim 1, wherein the component for preventing coalescence of the lacquer is selected from the group consisting of one or several aliphatic amines having an average molecular weight of 75 to 133, mixtures thereof or derivatives thereof.

6. A method as claimed in claim 1, further comprising the step of mixing a biocidal component in the spraying composition to prevent the proliferation of microorganisms.

7. A method as claimed in claim 1, further comprising the step of mixing a component for stabilizing the emulsion, or dispersion of the lacquer in the water with the spraying composition.

8. A method as claimed in claim 1, wherein the step of enrichment of the lacquer-containing residue substantially up to the lacquer content of the freshly fed spraying composition proceeds in essentially continuous manner, the residue enriched with lacquer being reused for spraying painting in an essentially continuous way.

9. A method as claimed in claim 1, wherein in the enrichment of the lacquer-containing residue substantially up to the lacquer content of the freshly fed spraying composition proceeds in essentially discontinuous manner, in batches, the lacquer-enriched residue being stored in an intermediate reservoir prior to being reused for spray painting.

* * * * *